United States Patent [19]

Delavaux

[11] Patent Number: 5,633,743
[45] Date of Patent: May 27, 1997

[54] OPTICAL COMMUNICATIONS SYSTEM USING TUNABLE TANDEM FABRY-PEROT ETALON

[75] Inventor: Jean-Marc P. Delavaux, Wescosville, Pa.

[73] Assignee: Lucent Technologies Inc., Murray Hill, N.J.

[21] Appl. No.: 553,209

[22] Filed: Nov. 7, 1995

[51] Int. Cl.⁶ .................................................. H04B 10/12
[52] U.S. Cl. ........................ 359/173; 359/187; 359/179; 359/589; 385/27
[58] Field of Search .................................. 359/127, 161, 359/173, 179, 187, 589, 578, 188; 385/27

[56] References Cited

U.S. PATENT DOCUMENTS 4,196,396  4/1980  Smith ......................... 359/578
4,859,017  8/1989  Brierley et al. ................. 385/27
5,003,546  3/1991  Lidgard et al. ................. 372/26

OTHER PUBLICATIONS

Gabla et-al, "Practical Implementation of a Highly Sensitive Receiver Using an Erbium–Doped Fiber Preamplifier".

Primary Examiner—Wellington Chin
Assistant Examiner—Rafael Bacares
Attorney, Agent, or Firm—Richard D. Laumann; Lester H. Birnbaum

[57] ABSTRACT

A tunable tandem Fabry-Perot etalon in used in optical systems as a filter between two amplifier stages. The etalon filters the signal going from the preamplifier to the amplifier and provides further filtering as the output of the amplifier also passes through the etalon.

6 Claims, 1 Drawing Sheet

OPTICAL COMMUNICATIONS SYSTEM USING TUNABLE TANDEM FABRY-PEROT ETALON

TECHNICAL FIELD

This invention relates generally to the field of optical communications systems using tandem Fabry-Perot etalons and particularly to such systems using tunable tandem Fabry-Perot etalons as well as to the tunable tandem Fabry-Perot etalons.

BACKGROUND OF THE INVENTION

Optical communications systems using a light source and photodetector or signal regenerator optically coupled to each other by means of an optical fiber have reached a stage of significant commercial importance and technical sophistication. Data rates in excess of 10 Gbit/sec and transmission distances in excess of 1000 kilometers are routinely achieved. To reach these levels of importance and sophistication, many types of components have been developed and used.

To cover a long transmission distance, initial optical communications system detected optical signals and created electrical signals and then generated new optical signals using the electrical signals in a repeater. Newer optical communications systems use optical amplifiers to regenerate the signal. In such systems, the optical signals are optically amplified rather than being converted first into an electrical signal. The optical amplifiers are typically rare earth, such as erbium, doped optical fibers. See, for example, IEEE Photonics Technology Letters, pp. 727–729, Aug. 1991, for a description of an exemplary erbium doped fiber preamplifier. The fiber amplifier or preamplifier should amplify as little as possible of the amplified spontaneous emission (ASE); this can be accomplished with a filter that passes only the signal wavelength.

The preamplifier in the article mentioned also had a tunable optical filter which the authors stated could have any of several forms including a fiber Fabry-Perot filter. An exemplary tunable Fabry-Perot filter using optical fibers was described by Miller at the European Conference on Optical Communication, Sep. 16–20, 1990. Use of fibers permitted the size of the filter to be reduced as compared to the size of filters using bulk components; optical fibers can be spliced directly to each other. Tuning was obtained by temperature variations. Numerous uses for the filter were mentioned.

Later it was realized that two fiber Fabry-Perot filters connected in series could be advantageously used in some applications. See, for example, the article by Miller in Electronics Letters, 28, page 216, Jan. 30,1992 for a description of a two stage filter used in a wavelength division multiplexed system. See also, Applied Physics Letters, 59, pp. 2369–2371, Nov. 4, 1991, for a description of a tunable fiber ring laser using a tandem Fabry-Perot filter. The series tandem Fabry-Perot filter suffers from several drawbacks including, but not limited to: 1) Both filters must be tuned to the same wavelength; this requires complicated electronics. 2) The optical coupling between the two filters adds an additional optical loss to the system.

SUMMARY OF THE INVENTION

According to an embodiment of this invention; an optical device has a preamplifier with an input and an output; an amplifier with an input and an output; and a tunable Fabry-Perot etalon which has first and second inputs and first and second outputs. There are two optical paths through the etalon; the first and second optical paths are between the first input and first output and between the second input and the second output, respectively. The first and second inputs are connected to the outputs of the preamplifier and the amplifier, respectively; and the first output is connected to the amplifier. In another embodiment of the this invention, the etalon is used in reflection and the device further has an optical circulator having first, second, and third ports. The first and third ports are connected to the preamplifier output and the amplifier input, respectively. The second port is connected the the first input of the etalon. The first output of the etalon is connected to reflecting means.

In yet another embodiment of the invention, the optical device is used in an optical communications system having a transmitter and a receiver connected to the optical device. Optical fibers connect the transmitter and the preamplifier and the receiver and the amplifier of the device.

DETAILED DESCRIPTION

Figure 1:
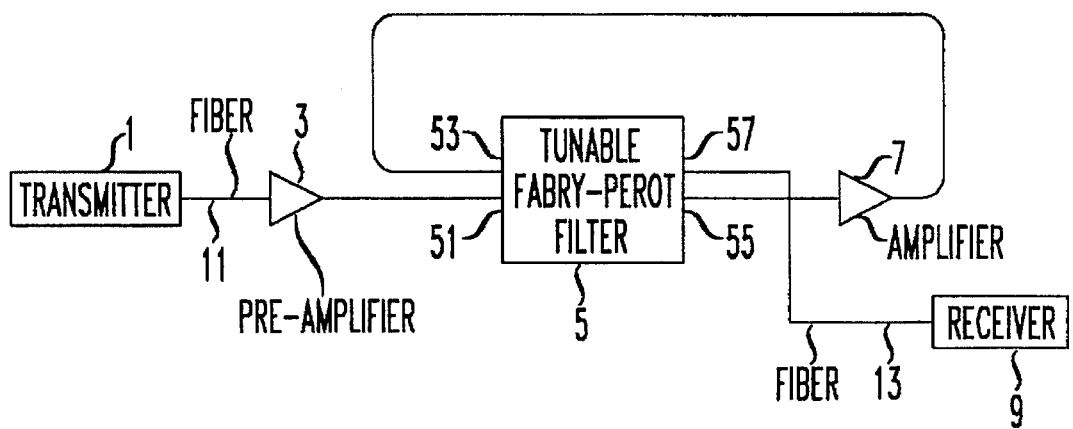
FIGS. 1 and 2 are schematic representations of an optical communications system which uses the tandem Fabry-Perot etalon between the preamplifier and the amplifier in transmission and reflection, respectively.

The invention will first be described by reference to the exemplary embodiment depicted in FIG. 1. It will be readily appreciated that, for reason of clarity, the elements depicted are not drawn to scale. Shown are transmitter 1, preamplifier 3, tunable tandem Fabry-Perot filter 5, amplifier 7, and receiver 9. These elements are connected to each other by optical couplers such as optical fibers 11 and 13 which connect the transmitter 1 and preamplifier 3 and the amplifier 7 and the receiver 9, respectively. Filter 5 has two inputs 51 and 53 and two outputs 55 and 57. There are two optical paths through the filter; the first and second paths are between input 51 and output 55 and between input 53 and output 57, respectively. Both optical paths may be tuned simultaneously; the tuning means are well known therefore not depicted. As shown, inputs 51 and 53 are connected to the outputs of preamplifier 3 and amplifier 7, respectively. The outputs 55 and 57 are connected to the input of the amplifier 7 and to receiver 9, respectively. It is emphasized that the term tandem Fabry-Perot filter is used to mean a filter having two parallel optical paths and not two filters connected in series. Elements are described as being coupled to each other; this terminology is used to mean optical coupling and does not preclude the possibility that intermediate elements are present.

All of these elements are well known to those skilled in art and will be readily constructed and connected together by those skilled in the art. The components of both transmitter 1 and receiver 9 are well known as are the fibers 11 and 13. Fabrication of the Fabry-Perot etalon is well known and its operation is described in literature for commercially available tunable etalons. Tuning of the filter is expediently performed by voltage or temperature variation.

The preamplifier 3 and the amplifier 7 may be termed input and output units, respectively. Both units have inputs and outputs. The tandem Fabry-Perot filter 5 is thus not only between the preamplifier and the amplifier stages but is also connected to the end of the amplifier stage. The first path through the filter 5 passes only the optical energy having a wavelength near the wavelength of the signal; the amplified spontaneous emission is not amplified by the amplifier. The second path through the filter 5 further improves the filtering. The configuration depicted insures that both paths are tuned to the same wavelength; this is a characteristic of the tandem Fabry-Perot filer. Simultaneous tuning of two series connected filters is thus avoided.

The configuration depicted maximizes gain and pump efficiency in the amplifier design. The arrangement also obviates the use of an isolator between stages and at the end of the amplifier because the Fabry-Perot etalon provides good isolation.

Figure 2:
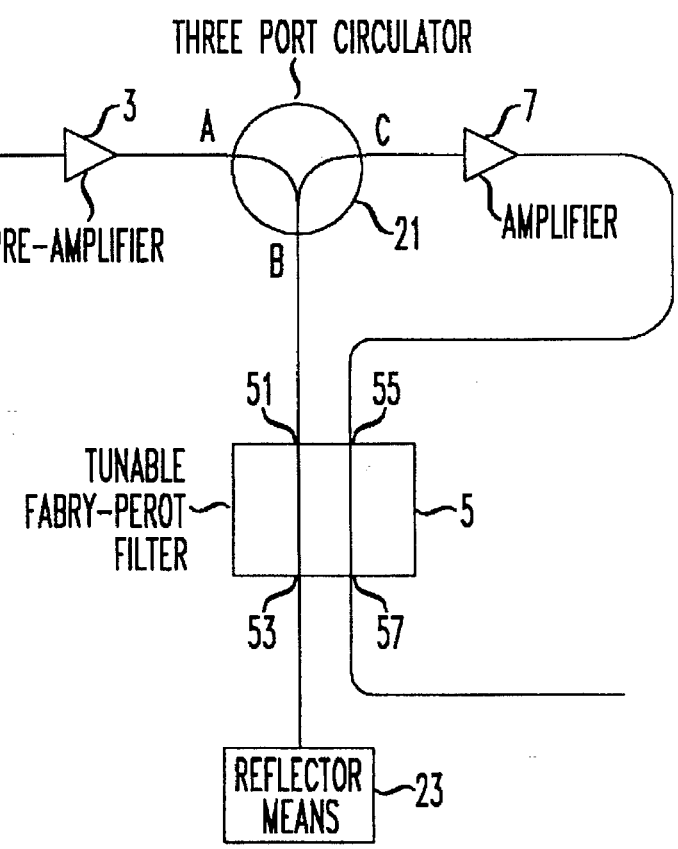

The embodiment depicted in FIG. 1 uses the etalon in transmission. An embodiment using the etalon in reflection is depicted in FIG. 2. In addition to the elements depicted in FIG. 1, three port circulator 21 having ports A, B and C is connected between preamplifier 3 and amplifier 7 which are connected to the A and C ports, respectively. Filter 5 is connected to the second port and to the reflector means 23. The reflector means 23 may be a Faraday rotator. This embodiment removes polarization mode dispersion and polarization dependent loss and because the filter is used twice, improved filtering is also obtained.

Variations of the embodiments described will be readily thought of by those skilled in the art. For example, although a system has been described, the device comprising the preamplifier and the amplifier as well as the intermediate elements is a useful optical device. Additionally, the etalon may have more than three optical paths.

The invention claimed is:

1. An optical device comprising:

a preamplifier, said preamplifier having an input and an output;

an amplifier, said amplifier having an input and an output; and a tunable Fabry-Perot etalon having two optical paths through said etalon, said etalon having first and second inputs and first and second outputs, said first and second inputs being connected to the outputs of said preamplifier and said amplifier, respectively; said first output being connected to said amplifier.

2. An optical device as recited in claim 1 further comprising an optical circulator having first, second, and third ports, said first and third ports being connected to said preamplifier output and to said amplifier input, respectively, said said port being connected to said first input of said filter.

3. An optical device as recited in claim 2 further comprising reflector means connected to said first output of said filter.

4. An optical system comprising a transmitter;

a preamplifier, said preamplifier having an input and an output;

an amplifier, said amplifier having an input and an output;

a tunable Fabry-Perot etalon having two optical paths through said etalon, said etalon having first and second inputs and first and second outputs, said first and second inputs being connected to the outputs of said preamplifier and said amplifier, respectively; said first output being connected to said amplifier;

a receiver; and optical fibers optically connecting said transmitter and preamplifier and said receiver and said amplifier.

5. An optical system as recited in claim 4 further comprising an optical circulator having first, second, and third ports, said first and third ports being connected to said preamplifier output and to said amplifier input, respectively, said said port being connected to said first input of said filter.

6. An optical system as recited in claim 5 further comprising reflector means connected to said first output of said filter.

* * * * *